May 26, 1970 P. R. HERSHBERGER 3,513,744
MAP OR CHART CUTTER
Filed Sept. 30, 1968 2 Sheets-Sheet 1
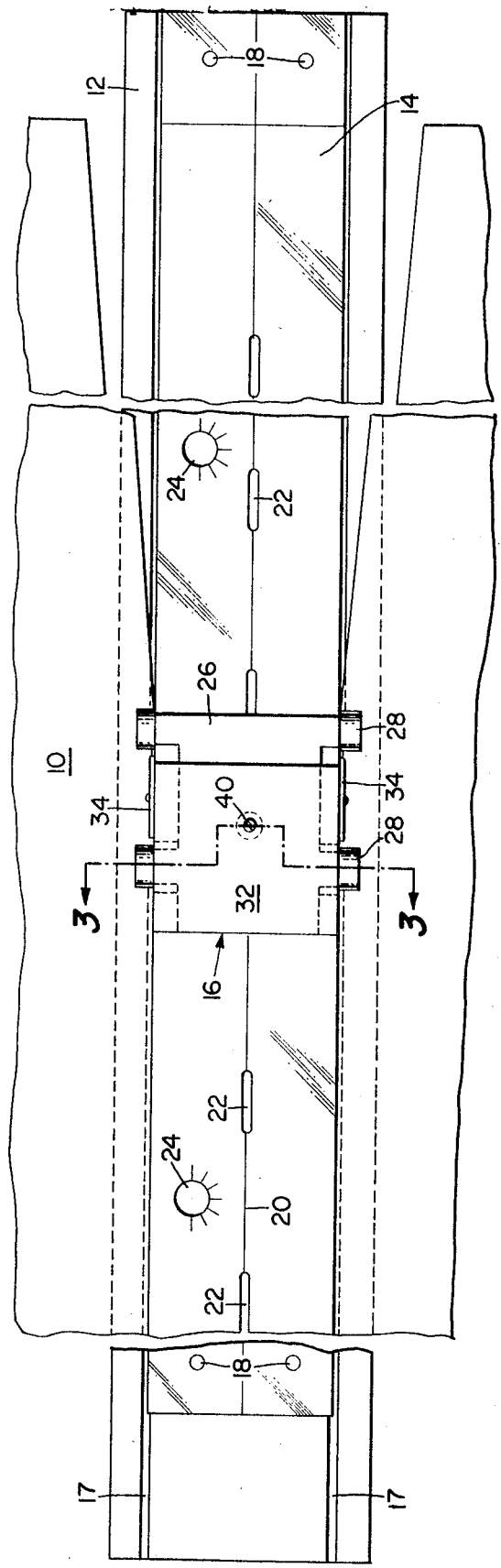
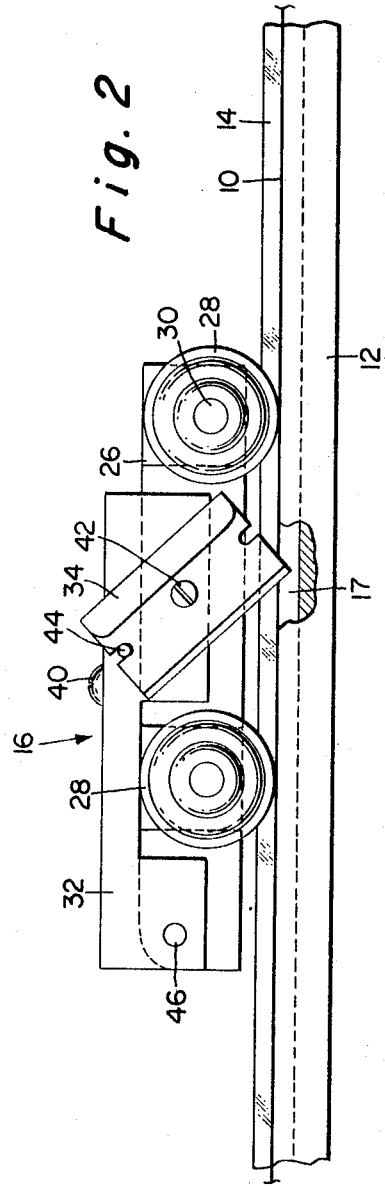
INVENTOR.
PAUL R. HERSHBERGER
BY *Harold J. Murray, J* AGENT
*P. Baxter Warner*
ATTORNEY May 26, 1970     P. R. HERSHBERGER     3,513,744

MAP OR CHART CUTTER

Filed Sept. 30, 1968     2 Sheets-Sheet 2

United States Patent Office 3,513,744
Patented May 26, 1970

3,513,744
MAP OR CHART CUTTER
Paul R. Hershberger, 686 Barbara Ave.,
Akron, Ohio 44306
Filed Sept. 30, 1968, Ser. No. 763,687
Int. Cl. B26d 1/04, 7/00
U.S. Cl. 83—520
5 Claims

ABSTRACT OF THE DISCLOSURE

A device for cutting out a portion of a large map or navigation chart, the portion so cut out being of interest to personnel of a vehicle traveling between two locations represented by points on the map. A carriage mounted on rollers supports a pair of spaced-apart cutting edges which, as the carriage is manually moved along a guide overlying the two points of interest on the map, cuts out from the latter a strip which can be conveniently handled by personnel of the vehicle without being encumbered with the remaining map portion which contains nothing of interest insofar as this particular journey of the vehicle is concerned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

When the operator or navigator of a vehicle traveling between two locations represented by points on a map or navigation chart refers to such map or chart for guidance, it is potentially confusing as well as time-consuming to be encumbered with a large document much of which is of no interest whatsoever insofar as this particular journey of the vehicle is concerned. Consequently, it is customary to cut out from the chart a portion covering only that region through which the vehicle is to travel, discarding the remainder of the chart. Normally, such apportioning has been accomplished by employing a pair of scissors or a razor blade, with the attendant possibility of injury to personnel by contact with the exposed cutting edge. Not only does this procedure produce a cut-out portion with uneven, occasionally ragged edges, but the two opposite sides of any strip bisected by a line drawn between the vehicle's destination and its point of departure are frequently not parallel, rendering the strip unsuitable for incorporation into a map cartridge of the type installed, for example, in an aircraft cockpit as part of the plane's navigation equipment. Furthermore, time limitations between notification of route and time of aircraft take-off are such that the above-described methods of map cutting occasionally cause delays and in extreme cases even necessitate schedule revisions.

It is important to recognize the value of having available a device which can be quickly and easily operated in a fool-proof manner by unskilled aircraft support personnel to apportion a large map or chart so as to eliminate those areas of no interest to the operator of a vehicle traveling between two points marked on such map or chart. Furthermore, occasions arise when a number of vehicles, such as aircraft on a combat mission toward a common objective, are to follow the same course, and, by utilizing the invention device, a plurality of maps can be apportioned in such a manner as to yield a plurality of identical strips equal in number to the number of aircraft embarking on the mission. By cutting out identical portions of the respective maps, the possibility of error is practically eliminated, and, if the map-cutting operation is performed immediately prior to aircraft takeoff, allowance can be made for last-minute revisions in course and/or flight plans. Use of the invention device thus introduces an important safety factor, especially when multiple cutting operations are to be carried out under pressure by unskilled personnel in situations where any deviation from conformity in even a single cut strip can lead an aircraft off course and hence endanger the success of an entire combat mission.

SUMMARY OF THE INVENTION

In accordance with a feature of the present invention, a device is provided for apportioning a map or navigation chart for convenience of handling by personnel of a vehicle planning to travel between two locations represented by points on the chart. A carriage mounted on rollers and supporting a pair of spaced-apart cutting edges is guided over the chart between the respective points of vehicle departure and destination, the cutting edges of the carriage acting to separate out from the chart a strip depicting only that area of interest to personnel on the vehicle. The remainder of the chart is thus no longer present to encumber such personnel with material having no bearing on the journey.

STATEMENT OF THE OBJECTS OF INVENTION

One object of the present invention, therefore, is to provide an improved device for apportioning a map or chart.

Another object of the invention is to provide a device for cutting out from a map or chart a portion covering an area of interest to personnel of a vehicle traveling between two locations represented by points on such map or chart.

A further object of the invention is to provide a device of the class described in which a carriage supporting a pair of spaced-apart cutting edges may be manually actuated over the surface of a map or chart so as to cut out from the later a selected portion of interest.

An additional object of the invention is to provide a transparent cover overlying a portion of said map or chart, such transparent cover acting as a guide for a manually-actuatable carriage in moving between two positions on such chart and performing a cutting operation as a function of such movement.

Other objects, advantages, and novel features of the invention will become apparent from the following detailed description of the invention when considered in conjunction with the accompanying drawings.

BRIEF DESCRIPTION OF THE DRAWINGS

FIG. 1 is a plan view of a cutting device constructed in accordance with a preferred embodiment of the present invention, and showing a map or chart in the process of being cut thereby;

FIG. 2 is a side view of the cutting device of FIG. 1;

DESCRIPTION OF THE PREFERRED EMBODIMENT

Figure 4:
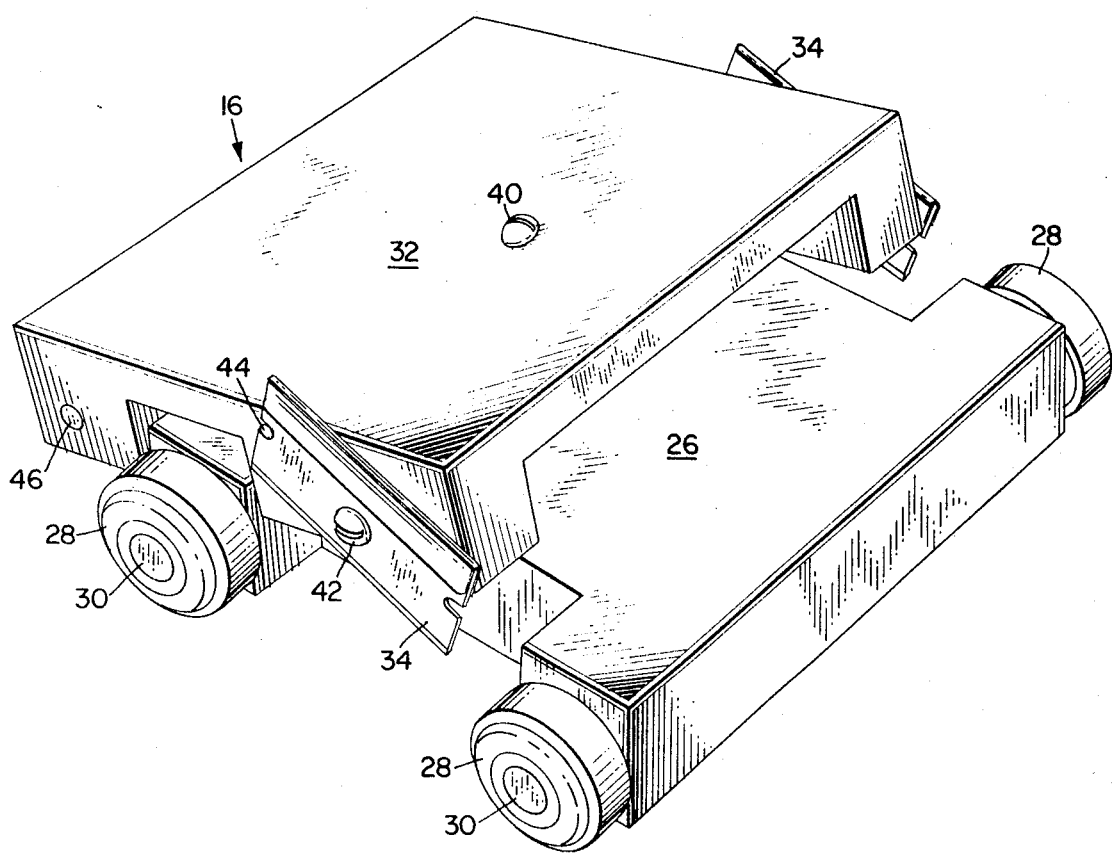
FIG. 4 is an enlarged perspective view of one of the members shown in FIG. 1.

Referring now to the drawings, there is shown therein a map cutitng device designed in accordance with a preferred embodiment of the present invention. The device illustrated includes three cooperating components which are functionally interrelated so as to selectively bring about the apportionment of a map or navigation chart, the latter being identified generally in FIG. 1 by the reference numeral 10. The three components which make up the invention device are (1) a base member or cutting table 12, (2) a transparent cover 14 overlying the base member 12, and (3) a manually-actuatable carriage 16 designed to travel along the base member 12 and be guided by the edges of the cover 14 so as to selectively apportion the chart 10.

Before setting forth in the mode of operation of the invention device, a more detailed description of each component might aid in an understanding of how the desired results are achieved. Considering first the base member or cutting table 12, one design which has been found to be especially suitable consists of a sheet of anodized aluminum of 3/8" thickness, 4'6" in length, and 5½" in width. The upper surface of this cutting table has formed therein a pair of grooves 17 parallel both to one another and to the longitudinal axis of the table, these grooves 17 being .125" wide and .125" in depth. They are centerlined .782" in from each side of the table. The purpose of these grooves 17 is to receive the cutting edges of the manually-actuatable carriage 16 (to be described hereinafter) and to allow such edges to cut the chart 10 without becoming dulled by contact with the material of the table 12.

Four dowels 18 are press-fitted into the cutting table 12 (two near each end) to permit alignment therewith of the transparent cover 14 in a manner best shown in FIG. 1.

Figure 3:
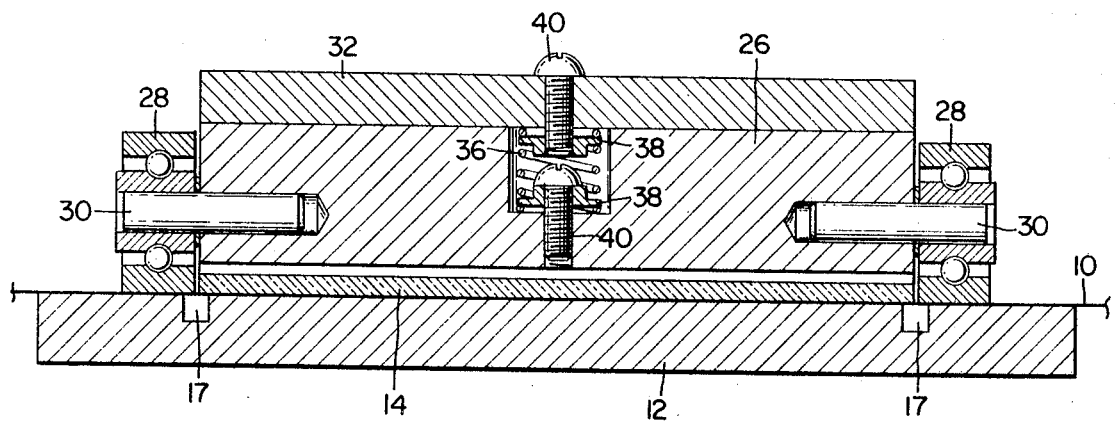
FIG. 3 is an enlarged sectional view of the device of FIG. 1 taken along the line 3—3.

The transparent cover 14 which overlies the base member 12, as shown in FIGS. 1, 2 and 3, may be formed of 1/8" thick Plexiglas, 4'3" long and 3⅞" in width. Four openings (two near each end) receive the dowels 18 and hence align the cover 14 with the table 12 when these two members are brought together so that the chart 10 is "sandwiched" therebetween as shown in FIG. 2.

The cover 14 may have a longitudinal center line 20 inscribed thereon to represent an aircraft flight path. A plurality of 1" long, 1/16" wide openings 22 may be provided along the line 20 to allow marking such flight path on the chart 10. Additional circular holes 24 may also be provided to allow optional marking on the chart 10 of turn radii as desired by the pilot of an aircraft utilizing the invention device. Being transparent, the cover 14 shows an operator exactly how wide a strip will be after it is cut from chart 10, and in addition provides a guide for movement of the carriage 16, as will hereinafter become apparent.

The carriage 16 is best illustrated in perspective in FIG. 4 of the drawings. It comprises a base member 26 which may be fabricated of aluminum stock, 4" square and 1" thick. Four wheels in the form of roller bearings 28 are mounted on the respective corners thereof. The inner spacing between the wheels or roller bearings 28 is chosen so that, when the carriage 16 is placed on the base member 12 as shown in FIGS. 1, 2 and 3, the edges of the transparent cover 14 serve as a guide for movement of the carriage 16 from one end of the base member 12 to the other. This relationship is particularly clear in FIG. 3. Four dowel pins 30 are pressed into the body of the carriage 26 to respectively support the four wheels or roller bearings 28.

A blade holder 32 supports a pair of angularly-disposed cutitng edges 34 mounted on opposite sides of the carriage 16, as best shown in FIGS. 1, 2 and 4. This blade holder is spring-biased upwardly (see FIG. 4) with respect to the member 26 so as to maintain the cutting edges 34 above the base member 12 (and chart 10) until such time as an actual cutting operation is being performed. The biasing action is performed by a spring 36 (see FIG. 3) positioned by a pair of retainer elements 38 held in place by screws 40.

The cutting edges 34 may comprise razor blades respectively secured to the holder 32 by screws 42 and restrained from angular movement by pins 44. Only one set of these elements 42 and 44 is visible in FIG. 4 due to the manner of taking the perspective view.

The blade holder 32 is mounted for limited angular movement with respect to the carriage 26. The axis of movement is defined by a pair of inwardly-projecting pins 46 carried by the blade holder 32 (one of which pins is illustrated in FIG. 4) respectively receivable in aligned openings (not shown) formed in the carriage 26. Consequently, downward pressure on the blade holder 32 against the action of spring 36 compresses the latter and lowers the cutting edges 34.

Referring back to FIG. 1, when a cutting operation is to be performed, the transparent cover 14 is removed from the base member 12. The chart 10 is placed on the latter and then the cover 14 placed over the chart 10 so that the dowels 18 are received in their associated cover openings. The chart is then manipulated so that the transparent cover 14 defines a geographical area of interest to the operator of a vehicle intending to travel between two points lying on the center line 20. A course marking may then be inscribed if desired on the chart through the openings 22.

The carriage 26 is then placed on one end of the base member 12 with the cutting edges 34 facing the chart. A downward pressure by the op erator member 32 causes the blades to extend below the surface of the base member and to enter their respective grooves 17 after passing through the material of the chart (note FIG. 2). The carriage 26 is pushed along the base member, preferably in a single stroke, until a strip is completely cut out of the chart. The cover 14 is then lifted off the base member to allow the cut strip to be removed. FIG. 1 clearly illustrates an intermediate point in such a cutting operation.

Obviously many modifications and variations of the present invention are possible in the light of the above teachings. It is therefore to be understood that within the scope of the appended claims the invention may be practiced otherwise than as specifically described.

I claim:
1. A device for apportioning a map or navigation chart for convenience of handling by personnel of a vehicle planning to travel between two locations represented by points on said chart, the apportionment of said chart resulting in the formation of a strip the respective boundaries of which lie to each side of a line interconnecting said points and with the width of said strip being limited primarily to coverage of that geographical region of interest to personnel on said vehicle in traveling between said two locations, said device comprising:

an elongated planar base member of rectangular configuration having a pair of longitudinal grooves formed therein which are parallel both to one another and to two opposite edges of said rectangular base member;

a transparent cover also of rectangular configuration overlying said base member between the said pair of grooves, said transparent cover having a linear cursor thereon lying mid-way between and parallel to said pair of grooves, said map or chart being receivable between said cover and said base member so that said cursor, as viewed through said transparent cover, in effect interconnects the two points on said chart between which said vehicle is to travel;

a manually-actuatable carriage having two pairs of supporting rollers adapted to engage and be positioned in part by said transparent cover such that two opposite edges of the latter act as a guide for said rollers as said carriage is caused to travel along said base member in response to manual actuation; and a pair of spaced-apart cutting edges supported and positioned by said carriage, said cutting edges being respectively receivable in the pair of grooves formed in said base member, whereby, as said carriage is manually actuated to cause it to travel along said base member, said edges cut into the material of said chart and apportion the latter so as to form a strip the width of which is such as to depict a geographical region of interest to personnel on said vehicle in traveling between said two locations.

2. An apportioning device according to claim 1, in which said transparent cover has formed therein a plurality of spaced-apart slits lying along said cursor, whereby a broken line interconnecting the two points between which said vehicle is to travel may be inscribed on said strip through said slits.

3. An apportioning device according to claim 1, in which said carriage is composed of two articulated sections, one of which is directly supported by said rollers and the other of which supports and positions said pair of spaced-apart cutting edges.

4. The device of claim 3, further comprising a resilient member located intermediate the two articulated sections making up said carriage, said resilient member normally biasing said articulated sections apart and being compressed as a function of such relative movement therebetween as occurs upon a manual actuation of said carriage along said base member.

5. The device of claim 4 in which said resilient member is a coil spring.

References Cited

UNITED STATES PATENTS 1,167,435   1/1916   Robertson et al. _____ 83—520

FOREIGN PATENTS 445,452   2/1949   Italy.
243,509   2/1947   Switzerland.

WILLIAM S. LAWSON, Primary Examiner

U.S. Cl. X.R.

83—614, 620